Dec. 27, 1938.  B. BISCHOF  2,141,167
CONTROL MEANS FOR HYDRAULIC TRANSMISSION
Filed Nov. 30, 1936  3 Sheets-Sheet 1

Inventor:
Bernhard Bischof
by A. A. Kliche and
Cornell Cannon Jr.
Attorneys

Dec. 27, 1938. B. BISCHOF 2,141,167
CONTROL MEANS FOR HYDRAULIC TRANSMISSION
Filed Nov. 30, 1936 3 Sheets-Sheet 2

Inventor:
Bernhard Bischof
Attorneys

Patented Dec. 27, 1938

2,141,167

UNITED STATES PATENT OFFICE

2,141,167

CONTROL MEANS FOR HYDRAULIC TRANSMISSION

Bernhard Bischof, Kiel, Germany

Application November 30, 1936, Serial No. 113,284
In Germany December 11, 1935

7 Claims. (Cl. 60—53)

This invention relates to a servo-control means, capable of being actuated manually or automatically, for use with continuously variable hydraulic gears of the piston type, such as the hydraulic gears of the type shown in applicant's co-pending application S. N. 740,669 filed August 20, 1934, in which the stroke of the pistons may be varied by the relative adjustment of two eccentrics situated one over the other, the hydraulic gear transmitting the output partly mechanically and partly hydraulically, or only hydraulically.

In gears of this character the stroke is varied by the adjustment of a driving crank which comprises two eccentrics situated one over the other. According to the invention, this takes place by means of two spur wheels, which are arranged within a casing in the manner of a geared pump (referred to in the further description as a "servo-motor"), and which are set into opposite rotation by the driving liquid, so that in this way the said two eccentrics are always rotated simultaneously to the same angular extent in opposition to one another. The opposite rotation of the two spur wheels is caused by means of two larger gear wheels, which are so connected one each with the two eccentrics that each eccentric is compelled to rotate together with the gear wheel pertaining thereto. The servo-motor is actuated by oil under pressure, which may be supplied from the pressure chamber of the gear. This oil is conducted either to the one or the other driving end of the servo-motor by a regulator valve of the known kind. The movement of this regulator valve out of its neutral position, i. e., that in which its two ends cover openings which supply the oil under pressure to the servo-motor, may be performed by hand.

In the case of automatic control there is employed for movement of the regulator valve a piston, the one side of which is subjected to the oil pressure from the pressure chamber of the gear, and the opposite side of which is acted upon by a spring. Different pressures arising in operation result in different positions of the piston. For returning the regulator valve into its neutral position there is employed a device of the kind known per se.

In this neutral position the servo-motor locks the two eccentrics in the position in which they happen to be situated, as in the spur wheels of the servo-motor the opposite torques of the two eccentrics, imparted to the said spur wheels by the larger spur wheels with which they mesh, counterbalance each other. Since, therefore, merely small forces are required for blocking the gear wheels of the servo-motor, the liquid which is imprisoned in the pipes between the regulator valve and the servo-motor and cannot escape in view of the neutral position of the regulator valve is sufficient for the purpose in question.

With this arrangement it is possible to perform any desired angular movement of the two eccentrics.

To accomplish the same effect in amplified form there may also be employed a plurality of servo-motors, which all act in analogous fashion on the two eccentrics.

Hydraulic gears of the kind described are usually so driven that the output of a power source, such as an electromotor, a Diesel engine or the like, acts on a pump shaft, which in turn transmits its output mechanically and hydraulically to the gear casing, which is thus set into rotation. The varied output of the gear is then taken over in suitable fashion by the rotating casing.

A particular advantage of the invention is obtained in those cases in which the output of a power source causes rotation of the gear casing, which in turn transmits the output mechanically and hydraulically to the pump shaft, which conducts the power further. With this method of driving the gear there is obtained, as well known, the result that starting may be effected at zero and the speed of the driven shaft increased from zero to maximum without any losses being incurred upon starting due to throttling. In this case a relative angular displacement of the two eccentrics of the motor casing is necessary up to twice 180°. The particular advantage of the invention consists in the fact that the servo-motor is adapted to perform a plurality of functions simultaneously, viz., a. It acts as power source for the regulation.
  b. It acts as locking mechanism for the control.
  c. It acts as mechanism for reversing the direction of rotation of the eccentrics.
  d. It serves, through the medium of gear wheels, to permit of the angular displacement of the two eccentrics to any desired degree (180° or more).

Owing to the fact that the servo-motor in the embodiment according to the invention fulfils a plurality of functions it is accomplished that the entire control mechanism may be made up of very few elements, which are chiefly circular in form, so that the complete mechanism may be accommodated in a minimum of space.

The invention will now be described more fully with reference to the accompanying drawings, the different figures of which illustrate the operation of a gear of this nature and also a specific form of embodiment of the invention for actuation by hand and for automatic control.

Figure 1:
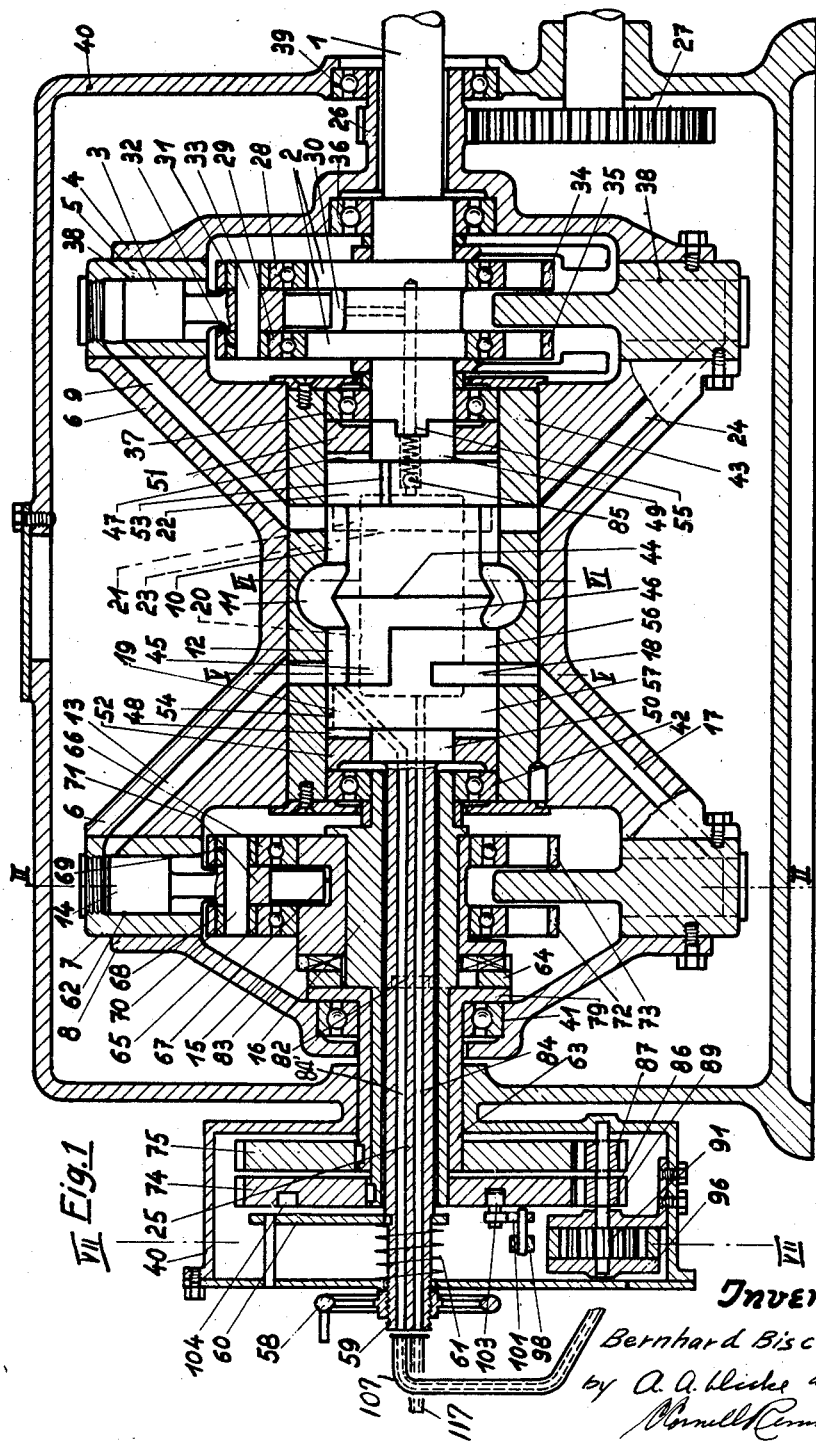
Fig. 1 is a longitudinal section taken through a gear and through the servo-control means.

The driving shaft 1 is connected at its one end to the corresponding parts of the machine to be driven, for example an electro-motor, internal combustion engine or the like. This shaft 1 is conducted into the interior of the gear casing and rotates the eccentric firmly connected therewith. This eccentric 2 is surrounded by two anti-friction bearings 28, 29, and is so constructed that between the parts of the eccentric 2 which carry these bearings there is formed a recess 30. On the outer periphery of these bearings there are provided slide members 31, 32 having a bore in which is mounted a wrist pin 33 carrying the cross-head, the piston rod and the piston 3. Two rings 34, 35 are provided about the outer periphery of the sliding members.

All of the parts described up to now, viz., the driving shaft 1 with the eccentric 2, the pistons 3 and the parts carrying the pistons, are rotatably mounted by means of bearings 36, 37 in the pump cylinder casing, the axis of the driving shaft 1 being identical with the longitudinal axis in this casing. The pump cylinder casing contains a plurality of radially directed borings 38 in which the pistons 3 are adapted to move.

On to the pump cylinder casing 5 there is flanged a cover 4, to which there is secured the gear wheel 26 and which carries at its end anti-friction bearings 39, so that the pump cylinder casing is able to rotate together with the cover 4 in the box 40.

The pump cylinder casing 5 is firmly connected to the distributor casing 6, which contains the slide valves, and to the motor cylinder casing 7, which is rotatably mounted by means of the bearings 41, 42 about the motor shaft 16 in the box 40. These three casings, which are firmly screwed together, accordingly constitute a rotatable unit.

In the distributor casing 6 there are provided passages 9, 13, 17, 24, which communicate at the one end with openings at the outer ends of the borings in the pump cylinder casing 5 and the motor cylinder casing 7, there being one passage for each cylinder.

The said passages open out at their opposite ends into a central cylindrical hollow space which forms the centre of the distributor casing 6 and accordingly the central point of the gear between the pump cylinder casing 5 and the motor cylinder casing 7. This central space acts as a bearing sleeve for the slide valves. For the sake of convenience in the construction a separate bearing sleeve 43 of suitable material may also be pressed into the said space. The slide valves are so constructed that they distribute the current of liquid between pump cylinder casing and motor cylinder casing. The pump slide valve 22 is connected with the driving shaft 1 in such a way that this slide valve is compelled always to rotate in common with the driving shaft 1.

The motor slide valve 19 is firmly connected with the spindle 25 and is firmly held by this spindle against rotation. The two slide valves are co-axial, have a bell-like form, and may be caused to move together with their annular end faces in the plane of contact 44, this position being their normal position of operation. In this position their inner spaces form a common chamber, the apertures 18, 23 of which register with certain of the passages in the distributor casing.

In the outer periphery of the slide valves there are provided recesses or cavities 45, which form about a part of the outer periphery of the slide valves a second hollow space 10, 12, which communicates with the remaining passages in the distributor casing. In the outer face of the slide valves there is also provided an annular recess 46 adjacent the plane 44 in which the slides contact. The annular end faces of the slide valves widen out in the plane of contact towards the outside. In the same plane 44 there is also located an annular recess 11 in the distributor casing, so that in this plane there is an increase in the size of the outer hollow space.

At the lateral ends of the slide valves an annular hollow space 47, 48 is formed in each case by the fact that the diameter of the cylindrical members 49, 50, which establish connection between the shafts and the slide valves, is made to be smaller than the outer diameter of the slides. These cylindrical members are made to fit in exactly sealing fashion in borings in the rings 51, 52. The small annular hollow spaces 47, 48 communicate with each other by means of grooves 53, 54 provided in the outer periphery of the slides, so that oil under pressure which is situated in the outer hollow space 10, 11, 12 of the slide valves is compelled to penetrate into the spaces 47, 48. The pump slide valve 22 is connected with the driving pump shaft 1, and the motor slide valve 19 is firmly connected with a spindle 25, by means of which it is always held in a certain position in relation to the motor crank 15, 16. The connection of the slide valves with the adjacent parts is such that in the radial direction the slide valves are able to adjust themselves in one co-ordinate plane and to be sealed off against the bearing sleeve (for example by means of claws 55). Owing to the recesses aforesaid in the outer surface of the slide valves 19, 22 there are formed projecting ledges 56, 57 which constitute the sealing means between the slide valve pressure space 10, 11, 12 and the openings 18, 23 in the slide valves which establish connection between the suction space 20, 21 and the suction passages 17, 24 of the distributor casing 6. As regards this seal it is important that the sealing faces be pressed one against the other. This is produced automatically by the pressure of the liquid, which on the opposite side of the openings acts laterally on the slide valve by way of the pressure oil flowing out of the pump portion. In order for this purpose to permit of the requisite lateral movement of the slide valves against the bearing sleeve in said co-ordinate plane the cylindrical member 49, which is firmly connected with the slide valve 22, is joined to its shaft by means of the claw 55. The cylindrical member 50 is connected to the resilient spindle 25.

Means are provided (for example hand wheel 58 and thread 59), which are adapted to shift longitudinally the motor slide valve spindle 25 and the slide valve 19 connected therewith so as to separate the two slide valves 19, 22 in the plane of contact 44, so that in this case a free connection for the liquid is established between the outer and the inner chamber.

At the outer end of the motor slide valve spindle 25 there is provided a plate 60 and, bearing against the same, a spring 61, which bears at its opposite end against the box 40. This plate prevents rotation of the motor spindle 25, but permits of its movement longitudinally. By means of the spring 61 it is accomplished that the spindle 25 always presses the annular end face of the motor slide valve 19 against the end face of the pump slide valve 22, the pressure of this spring sufficing in normal operation to hold the slide valves 19, 22 together despite the oppositely acting forces which occur at the contacting faces of the slide valves owing to the penetration of oil under pressure. The pressure of this spring 61 which presses the two slide valves one against the other is assisted by the oil pressure which occurs in the annular hollow spaces 47, 48 and likewise tends to press the two slide valves together at their ends.

Firmly connected with the distributor casing 6 is the motor cylinder casing 7 having a plurality of radially disposed cylindrical borings 62, which communicate by apertures at their outer ends with the passages 13, 17 in the distributor casing.

The motor cylinder block 7 is rotatably mounted with the aid of anti-friction bearings 41, 42 about the eccentric 16, through the central boring of which the motor slide valve spindle 25 is conducted to the outside of the gear. This eccentric 16 carries a second eccentric 15, which is adjustable about the said first eccentric 16 by rotation. It will be seen from the drawings that the outer anti-friction bearing 41, which carries the motor cylinder casing, is mounted on a bush or sleeve 63, which is connected with the second eccentric 15 by means of a coupling element 64. (See Figs. 3 and 4.) The construction of the outer eccentric 15 as regards the arrangement by means of which it carries the piston system is similar to that in the case of the eccentric 2 in the pump cylinder casing, that is to say—between the parts of the eccentric 15 which carry the bearings 65, 66 there is formed a recess 67. On the outer periphery of these bearings there are located sliding members 68, 69 (see Figs. 1 and 2) having a boring in which there is mounted a cross-head bolt 70 carrying the cross-head 71, the piston rod and the piston 14. Two rings 72, 73 surround the sliding members 68, 69 about their outer periphery.

Figure 2:
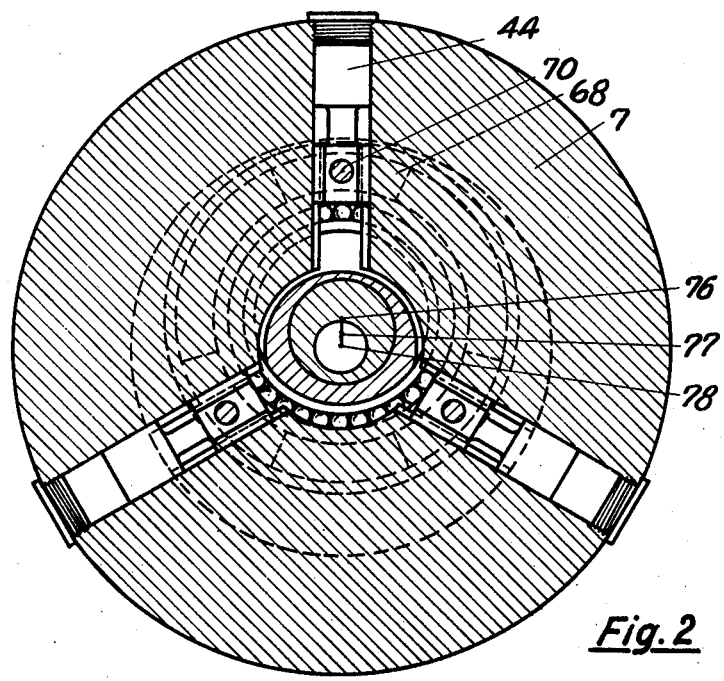
Fig. 2 is a section along the line II—II in Fig. 1.

In Figs. 1 and 2 the two eccentrics 15 and 16 are situated in that position in which the eccentricity of each is in exactly the same direction. The amount of eccentricity of the two eccentrics is the same. It will be clear that the two superimposed, relatively rotatable eccentrics must always result in a total eccentricity which is made up of the two single eccentricities and varies dependent on the rotation of the two eccentrics in relation to one another. The position of the two eccentrics in Figs. 1 and 2 shows the maximum total eccentricity in relation to the central longitudinal axis of the gear. This position of the two eccentrics 15, 16 in Fig. 1 showing the maximum eccentricity of both corresponds to that operative condition of the gear in which the motor takes up the maximum quantity of oil upon one revolution. This position of the eccentrics will be referred to hereinafter as their positive position.

Figure 7:
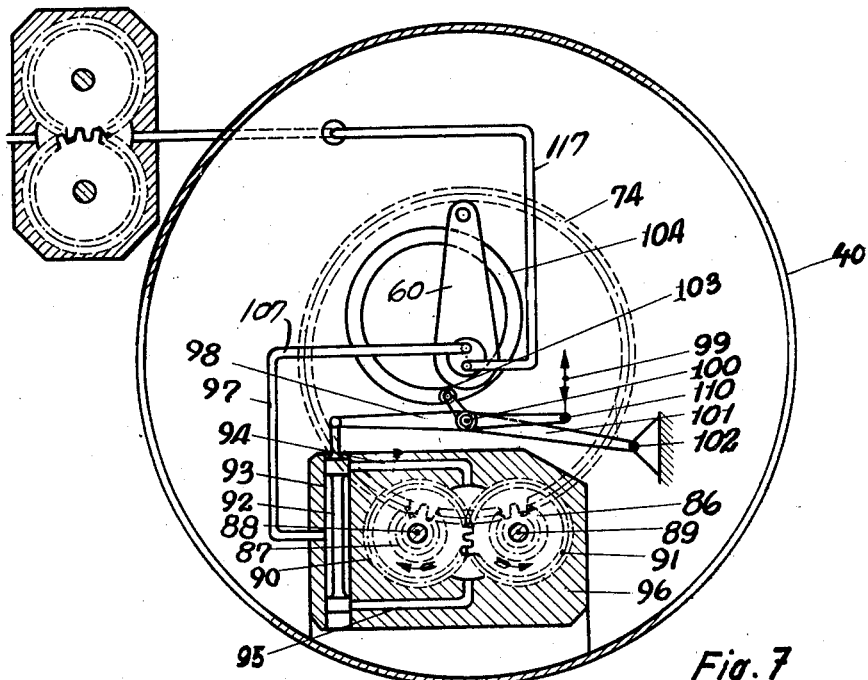
Fig. 7 is a section through the servo-control means along the line VII—VII in Fig. 1, for manual regulation.
Figure 8:
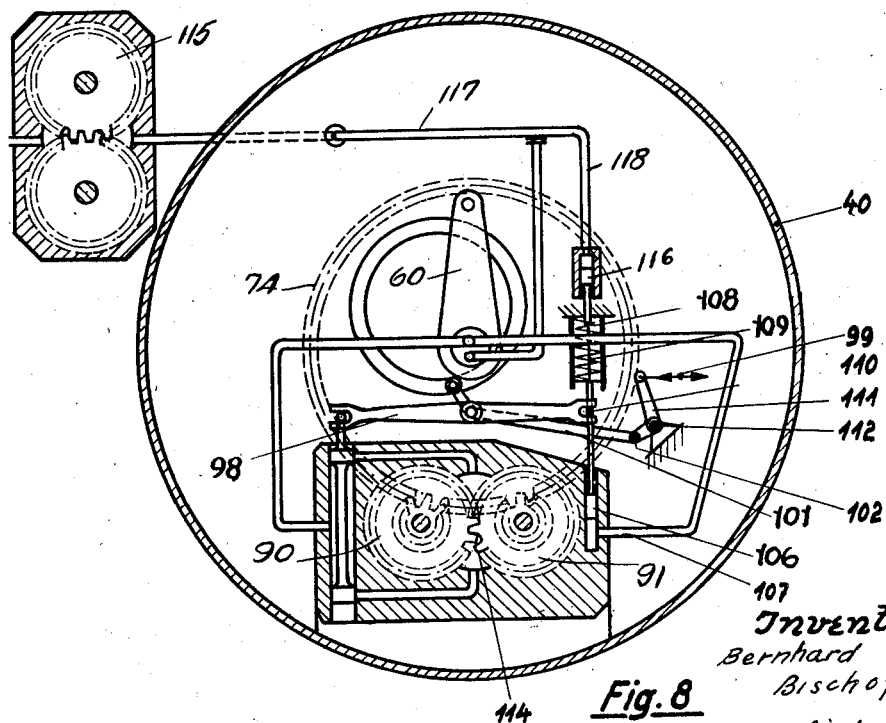
Fig. 8 is a similar section through a servo-control means, but for automatic regulation and for manual regulation.

As shown in Figs. 1, 7 and 8, there are provided according to the invention gear wheels 74, 75, which are so designed that the two eccentrics 15 and 16 may be adjusted in relation to one another, viz., to the same angular extent but in opposite directions. The result of this adjustment is always such that the outer axis of the outer eccentric 15, designated 76 in Fig. 2, can accordingly always move only in the same plane, which for example may also be identical with the plane of the drawing in Fig. 1. The position of the outer axis 76 of the outer eccentric 15 in relation to the axis of the gear is accordingly identical with the total eccentricity of the two eccentrics 15 and 16 and represents, therefore, the crank arm 77 which causes the stroke of the pistons 14.

It will be obvious that with this relative rotation of the eccentrics 15, 16 to the same angular extent in opposition to one another the outer axis 76 of the outer eccentric coincides with the gear axis 78 in a position of regulation in which there is secured the direct drive. The relative rotation of the eccentrics 15, 16 may also take place beyond this position towards the opposite side of the gear axis 78, which may be referred to as the negative position of the eccentrics. The effect of this latter adjustment of the eccentrics 15, 16 will be described later.

At the outer end of the shaft of the inner eccentric 16 and at the outer end of the sleeve 63 of the outer eccentric 15 there are provided gear wheels 74, 75, which are so designed that the two eccentrics 15, 16 may be adjusted to the same angular extent in relation to one another but in opposite directions. To obtain this adjustment a special clutch 64 is provided between the sleeve 63 and the outer eccentric 15.

Figure 3:
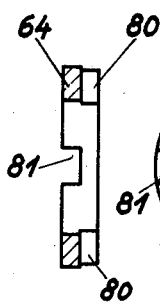
Fig. 3 is a section through the clutch fitted between the outer eccentric and its sleeve, and in the same plane as Fig. 1.
Figure 4:
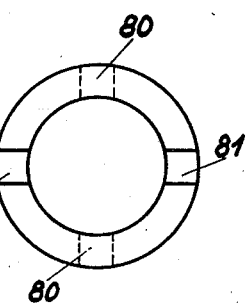
Fig. 4 is an elevational view of this clutch.
Figure 5:
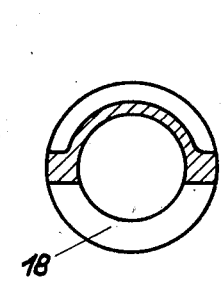
Fig. 5 is a section through a slide valve taken along the line V—V in Fig. 1.
Figure 6:
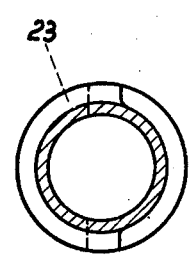
Fig. 6 is a section through a slide valve taken along the line VI—VI in Fig. 1.

This clutch 64 consists of a ring which is disposed in the space remaining between the outer eccentric 15 and a flange-like extension 79 of the sleeve 63. As also shown in Figs. 3 and 4, the ring 64 contains on either side prism-like grooves 80, 81, which are so disposed that the longitudinal axis of the grooves 80 on the one side is located at an angle of 90° in relation to the longitudinal axis of the grooves 81 on the opposite side. The grooves 81 on the one side are engaged by claws 82, which are provided on the side of the flange-like enlargement 79 of the sleeve 63. The prism-like grooves 80 on the opposite side of the ring 64 are engaged by similarly formed claws 83 carried by the outer side face of the outer eccentric 15. This arrangement of the clutch 64 produces the following result: When the sleeve 63 is rotated to any angular extent the clutch 64 is necessarily rotated to exactly the same angle. Further, the outer eccentric 15 must also be rotated to the extent of exactly the same angle as the clutch 64, so that the angular movement of the sleeve 63 produces exactly the same rotation of the outer eccentric 15. Since, however, means are provided to ensure that the sleeve 63 can rotate only to the same angular extent as the inner eccentric 16, but in the opposite direction thereto, it is accomplished by means of the clutch 64 that the outer eccentric 15 is also rotated in opposition to the inner eccentric 16.

With this arrangement of the adjustable motor eccentrics in a plane it is sufficient for the motor slide valve 19 to be held firmly in position by any suitable means in order to ensure that this slide valve 19 and the total eccentricity of the motor eccentrics 15, 16 in relation to one another must always be situated at a constant and invariable angle.

Means are provided for filling the gear with oil (boring 84), and there are also additional means, consisting for example of a safety valve, so that air and oil may be discharged towards the outside. This safety valve 85 is disposed in the axis of the gear, so that in the first place provision is made for escape of the air which will accumulate at that point.

In the following there will be described the conditions of operation when the speed of the driving shaft 1 is transmitted in a reduced ratio. In this connection it is assumed that the pump system and the passages of the distributor casing have been filled with a suitable liquid, which will usually be oil. The driving shaft 1 is set into operation by a motor, and it will also be assumed that the casing 4, 5, 6, 7, 8 is likewise set into rotation, but at a lower circumferential velocity than the shaft 1. There is accordingly a relative rotation between the pump shaft 1 and the said casing. Owing to this relative rotation between the pump shaft and the casing the pistons 3 are caused to perform a reciprocatory motion. Certain of the pump pistons suck up oil out of the space 20, 21 through the aperture 23 and the passages 24 into their cylinders, whilst the remaining pistons 3 move outwards and force the oil out of their cylinders through the passages 9 into the outer chamber 10, 11, 12 of the distributor casing 6. From this chamber 10, 11, 12 the oil flows through the passages 13 to the motor cylinders and exerts there on the motor pistons 14 an inward pressure, which acts by way of the piston bolts 70 and sliding members 68, 69 on the motor eccentric 15, 16. This pressure seeks to set the motor eccentric 15, 16 into rotation. Since, however, both eccentrics 15, 16 are firmly held by the control elements according to the invention, they are unable to yield to this pressure and a reactionary force is accordingly produced acting in the opposite direction on the casing 4, 5, 6, 7, 8, which is thus caused to perform the rotary motion which was assumed to occur in the above with reference to the conditions of operation. Immediately a motor piston 14 has reached its innermost position the passage 17 of the distributor casing 6 corresponding to this piston 14 is caused to communicate by way of the motor slide valve 19 with the inner chamber 20, 21 of the slide valves 19, 22, and the liquid from the cylinder space of the motor pistons is thus sucked into the inner chamber 20, 21 of the slide valves 19, 22 and thence into the cylinders in which the pump pistons are performing their suction stroke.

In addition to the stated drive by reason of the reactionary force of the firmly held motor crank 15, 16 the rotatable casing also has an additional drive imparted thereto by the torque of the driving shaft 1, which torque through the medium of the pump eccentric 2 mechanically drives the rotatable casing 4, 5, 6, 7, 8, so that the output of the rotatable casing is accordingly the result partly of direct drive and partly of hydraulic drive. As already stated, a certain quantity of oil is conveyed from the pump to the motor by reason of the comparative rotation between the casing 4, 5, 6, 7, 8 and the driving shaft 1. The amount of oil conveyed by the pump must always be equal to the amount taken over by the motor, and the circumferential velocity of the casing must be such that the motor is able to take over this quantity of oil. Naturally the circumferential velocity of the casing cannot be very high when the eccentricity of the motor eccentric is at a maximum, as in this case the piston stroke of the motor portion is very large and the largest possible quantity of oil will already be taken over upon one revolution. The amount of oil, therefore, which can be taken over by the motor portion diminishes in the same ratio as the motor piston stroke is made smaller by adjustment of the motor eccentric, so that the casing is now able to rotate more quickly. The positive eccentricity of the motor may be progressively reduced, so that in parallel therewith there may be obtained an increase in the circumferential velocity of the casing. At the moment when the eccentricity is equal to "zero" the circumferential velocity of the casing is equal to that of the driving shaft, as the motor pistons have no further stroke and the motor is accordingly unable to take over oil. In this position of the eccentric 15, 16 the output of the driving shaft 1 to the gear casing 4, 5, 6, 7, 8 is equivalent to direct drive. If now the eccentricity of the motor eccentric 15, 16 is additionally adjusted beyond the zero position towards the negative side, the motor portion is unable to take over any oil from the pump portion, but pumps oil to the outer pressure chamber 10, 11, 12 of the distributor casing 6, and thence into the pressure chamber of the pump. In consequence the casing must now assume a higher circumferential velocity than that of the driving shaft 1 in order that the oil is taken over by the pump cylinders. The operative condition in which the eccentricity of the motor eccentric 15, 16 is located on the negative side accordingly produces a speed ratio above unity. Owing to this regulation of the motor eccentric 15, 16 the transmission above unity may be increased as desired.

It will be apparent from the description that the outer chamber 10, 11, 12, which is formed by the two slide valves 19, 22, constitutes in normal operation the pressure chamber, in which the oil forced by the pump to the motor possesses a much higher pressure than the oil which is sucked up from the motor into the pump, so that the inner chamber 20, 21 of the slide valves 19, 22 forms the low-pressure or suction chamber. The excess of pressure prevailing in the outer chamber 10, 11, 12 in relation to the inner chamber 20, 21 is employed on the one hand to seal the part 56, 57 of the outer periphery of the slide valves 19, 22 in relation to those parts of the bearing sleeve 43 where such seal is required, viz., in the vicinity of the openings 18, 23 leading to the suction passages of the distributor casing. To permit of lateral displacement of the slide valves in a plane, these valves must be capable of being adjusted in the direction of pressure. This is rendered possible by the operating claw 55.

The excess of pressure in the outer chamber 10, 11, 12 in relation to the suction chamber 20 is employed on the other hand to press the two slide valves with their annular end faces in oil-tight fashion one against the other at 44. This is effected by the fact that the oil under pressure passes through the passages 53, 54 in the walls of the slide valves into the annular spaces 47, 48.

Disconnection of the gear takes place by lifting the one slide valve away from the other, so that in this way an open connection is produced between the outer pressure chamber 10, 11, 12 of the slide valves and the inner suction chamber 20, 21. The disconnection of the gear may be performed by hand by moving the spindle 25 (Fig. 1) together with the motor slide valve 19 connected therewith in the direction of the longitudinal axis, the slide 19 thus being moved away from the slide 22. As a result of the free connection between the pressure chamber 10, 11, 12 and the suction chamber 20, 21 the pressure from the pressure chamber 10, 11, 12 acting on the pistons of the motor is relieved, so that the driving force of the shaft 1 is unable to act hydraulically on the motor portion and accordingly on the casing.

In order slowly to start the stationary gear it is necessary for the two separated slide valves 19, 22 to be moved together. For this purpose the motor slide valve 19 is moved slowly by the hand wheel 58 and the spring 61 against the pump slide valve 22, and the passage between the pressure chamber 10, 11, 12 and the suction chamber 20, 21 thus slowly interrupted, so that in this manner pressure is again produced in the pressure chamber which is able to propagate to the motor portion. This arrangement permits of gentle starting without jolts.

The operations aforesaid have been described on the assumption that the drive takes place by means of the shaft 1 and that the output is transmitted by the driven casing 4, 5, 6, 7, 8. It will be obvious, however, that vice versa the casing 4, 5, 6, 7, 8 may be driven, transmitting the output to the shaft 1, which is then the driven shaft.

There will now be described a possible embodiment of the invention for actuation by hand and for automatic control.

For controlling the gear, in accordance with the invention, there are employed two spur wheels 74, 75, of which the one 74 is rigidly connected with the inner eccentric 16 of the motor portion, whilst the second spur wheel 75 is rigidly connected with the sleeve 63. These two spur wheels mesh continuously with two pinions 86, 87 mounted on the two shafts 88, 89 of the servo-motor. The servo-motor includes a spur wheel 90 rigidly connected with the one pinion 87 and a spur wheel 91 rigidly connected with the other pinion 86.

An additional component of the servo-motor is constituted by the regulator valve 92, the hollow chamber 93 of which, dependent on the position of the regulator valve 92, communicates at its two outer ends with passages 94, 95 in the casing 96 of the servo-motor, which lead on opposite sides to the two spur wheels 90, 91. The feed chamber 93 of the regulator valve 92 is connected, for example, with the pressure chamber 10, 11, 12 of the gear through the medium of a pipe 97. The lever 98 is pivotally connected at the one end to the regulator valve 92 and at its opposite end to elements 99, which permit of control of the regulator valve by hand. The said lever 98 is pivotally connected at 100 to a second lever 101, which in turn is pivotally connected at the one end at 102 to the box 40 surrounding the gear. At its opposite end the lever 101 carries a roller 103, which engages in a guide groove 104 provided in the spur wheel 74. The servo-motor together with all of the parts just described is accommodated in a casing 96 firmly connected with the box 40, which surrounds the entire gear. In this box 40 there are also mounted the ends of the two shafts 88, 89.

Fig. 8, in contradistinction to Fig. 7, illustrates an embodiment of the control means according to the invention for automatic actuation. Fig. 8 differs from the aforesaid embodiment according to Fig. 7 solely by the fact that in place of the hand-regulation device there are provided the automatic regulating means. These comprise the piston 106, the lower face of which, through the medium of the pipe 107, is subjected to the pressure of the pressure chamber 10, 11, 12, whilst the opposite side of the piston 106 is acted upon by the pressure of the spring 108, which is connected with the piston 106 by the rod 109.

The rod 109 also engages at 110 with the one end of the lever 98.

In order also in the case of the automatic actuation just described to be able to perform the adjustment by hand the lever 101, at the point 102, is pivotally connected to an additional lever 111, which latter is mounted to be pivotable at 112 in the box 40. This lever 111 is engaged by elements 99, by means of which there may be adjusted the lever 111 and accordingly the point 102 of the lever 101, so that in this way the automatic control means may also be actuated by hand as desired.

While the gearing or transmission is in operation an oil feed pump 115 of any desired construction, but shown in the drawings as a gear pump, continuously pumps fresh oil into the suction space 20 of the transmission, this occurring through conduit 117 connecting with the bore 84 in the shaft 25. The pressure in the conduit 117 depends upon the pressure in the suction space, the capacity of the oil supply pump, the viscosity of the oil, and the resistance to its flow from the suction space (see relief valve 85, Fig. 1). This pressure is therefore higher when the oil or other working fluid is cold and becomes less as the fluid becomes heated. The pressure in the high pressure space 11 of the gear or transmission is the sum of two pressures, viz., the said pressure in the suction space and the difference in pressure between the suction space and the pressure space, which difference is determined by the conditions of operation of the transmission. This combined pressure is applied to the piston 106 through tube 107 which is connected with the bore 84' in shaft 25 (see Fig. 1). The servo-motor is however to be controlled exclusively through pressure variations caused by the operating conditions of the transmission and not by the pressure variations existing in the suction space of the transmission since the pressure in the latter would result in incorrect control. In order to conveniently eliminate from the combined pressure in the pressure space the pressure in the suction space, a further pressure responsive member such as the piston 116 having the same diameter as the piston 106 is provided. Oil is applied to the cylinder of piston 116 through a conduit 118 connecting with the conduit 117 so that the pressure in the conduit 117 may operate upon piston 116. This pressure corresponds to the pressure in the suction space of the transmission. Since this pressure works oppositely to that acting upon piston 106, it is completely eliminated so that the servo-motor is controlled only by the difference of pressure in the transmission itself, entirely irrespective of pressure differences due to differences in viscosity.

In order to make clear the novelty of the invention and the operation of the servo-motor and its control as described in the following there will now be set forth with the aid of formulae the theoretical conditions with which the control means require to comply. This will serve to show the particular advantage of the invention, more particularly also in those cases in which the gear casing is set into motion by the driving machine and the varied output of the gear is taken over by the pump shaft 1. The formulae in question prove that in this arrangement a relative adjustment of the two eccentrics 15, 16 of the motor cylinder casing 7 is necessary in each case by 180°. The invention sets forth inter alia the practical solution to this problem, which is of particular importance in view of the fact that in the arrangement of the gear as above assumed the shaft 1 is capable of assuming any circumferential velocity from zero up to a desired maximum.

In the said formulae the following factors have been employed:

$n_1$=circumferential velocity of the pump shaft,
$n_2$=circumferential velocity of the casing,
$h_1$=stroke of the pump piston,
$d_1$=diameter of the pump cylinder,
$i_1$=number of pump cylinders,
$h_2$=stroke of the motor piston,
$d_2$=diameter of the motor cylinder,
$i_2$=number of motor cylinders.

In the case of $n_1$ revolutions of the driving shaft 1 and $n_2$ revolutions of the casing in the same direction the pump driven by the shaft 1 conveys liquid with $n_1-n_2$ revolutions by way of the distributing device (pump slide valve and motor slide valve) to the motor. The rotation of the gear casing takes place in part by the torque of the driving shaft, which is transmitted in the pump directly in mechanical fashion to the gear casing, and in part by reason of the torque resulting from the pressure of the liquid, which torque acts from the motor pistons on the locked motor shaft and by way of the latter, in the form of reaction force, also drives the casing. The oil conveyed by the pump is taken over by the motor and after effected work is again returned to the pump. The circumferential velocity of the casing must accordingly adjust itself to a figure at which the amount conveyed by the pump is equal to that taken over by the motor. There accordingly arises the condition:
$(n_1-n_2) \times h_1 d_1 i_1 = n_2 \times h_2 d_2 i_2$. This results in:
$n_2 = n_1 \times h_1 d_1 i_1 \div (h_1 d_1 i_1 + h_2 d_2 i_2)$.

This result shows that the circumferential velocity $n_2$ can be varied within certain limits by the variation of $h_2$. The formula in question shows the conditions when the shaft is driven and the output of the gear is taken over by the rotatable casing.

The following formula shows the conditions in respect of the circumferential velocity of the shaft 1 when the casing constitutes the driving element with the circumferential velocity $n_2$. In this case, therefore, $n_1$ is the circumferential velocity of the driven part:

$$n_1 = n_2 \times (h_1 d_1 i_1 + h_2 d_2 i_2) \times h_1 d_1 i_1$$

If—which is the most favourable from the point of view of manufacture—there is selected $d_1 = d_2$ and $i_1 = i_2$, there is obtained
$$n_1 = n_2 (h_1 + h_2) \div h_1$$
This formula shows, therefore, that $n_1 = 2n_2$ when the variable stroke $h_2 = h_1$, that $n_1 = n_2$ when the variable stroke $h_2 = 0$, and that $n_1 = 0$ when the variable stroke $h_2 = -h_1$.

In order now in the case of the eccentric mechanism to adjust the stroke $h_2$ from a value $+h_1$ (positive position) to a value $-h_1$ (negative position) it is necessary to rotate the two eccentrics in relation to one another by the very large angle of 180° in each case.

The invention solves this problem with very simple means and with a minimum requirement for space.

The described control mechanism acts in the case of manual adjustment (Fig. 7) as follows:

When by reason of a control movement by hand the lever 98 has been adjusted, for example, in such fashion about the point 100 that the regulator valve 92 connected therewith has been moved downwards, oil under pressure from the pressure chamber 10 of the gear passes out of the pipe 97 into the regulator valve chamber 93, and from there through the pipe 95 to the lower side of the servo-motor. This oil rotates the two spur wheels 90, 91 in the direction of the arrows, and the pinions 86, 87 connected with the wheels accordingly rotate in opposite directions the wheels 74, 75 meshing therewith. The groove 104 associated with the wheel 74 now moves, during this control movement, by means of the lever 101 and the lever 98, which is now held at the point 110, the regulator valve 92 again slowly moves upwards into that position in which its lower end blocks the flow of oil from the chamber 93 to the pipe 95.

Upon the movement of the regulator valve 92 upwards there occur the same effects in the opposite direction. It will be obvious that each manually adjusted position of regulation corresponds to a certain control position of the wheels 74, 75, which is always attained when the regulator valve 92 again reaches its middle blocking position.

The automatic control (Fig. 8) differs from the manual control above described by reason of the fact that the end point 110 of the lever 98 is displaced automatically. It will be clear that each pressure of the liquid acting by way of the pipe 107 on the piston 106 corresponds to a certain position of the piston 106. If now, for example, the resistance at the wheels 26, 27 of the gear becomes greater, the oil pressure in the gear also increases. An increased pressure accordingly acts on the end of the control piston 106 and moves it upwards and then, through the medium of the described lever mechanism, shifts the regulator valve 92 into that position in which oil under pressure enters the lower part of the servo-motor. In this way the motor crank is so adjusted that the stroke of the motor pistons is increased and that the gear compensates by a correspondingly greater transmission the greater torques occurring in respect of the increased resistance.

By the embodiment of the servo-motor and the control parts in accordance with the invention it is accomplished that these require merely small dimensions, as it is necessary for the servo-motor to overcome only frictional forces. Owing to the arrangement in question the torque of the motor cranks 15, 16, which in the extreme case may be very considerable, is divided into two parts acting on the large spur wheels 74, 75, which in turn transmit the torques in the same direction to the shafts 88, 89 and seek to turn these in this direction.

In this way forces which are equal as regards the number of teeth but are oppositely directed act on the spur wheels 90, 91 of the servo-motor, so that the torques are compensated at the point 114. In consequence, in view of the considerable oil pressures available, even very small dimensions of the servo-motor are sufficient for performing the regulation.

The quantity of oil which is imprisoned in the pipes 94, 95 between regulator valve 92 and servo-motor in that position of the regulator valve which has been referred to in the above as the neutral position accordingly suffices to block the mechanism.

What I claim as new and desire to secure by Letters Patent is:

1. A servo-control means adapted for use with hydraulic variable speed gears which are regulated without break by variation of the piston stroke by the relative displacement of two eccentrics situated one over the other and comprising in substance a pump, a motor, a mechanism for distributing liquid between the said motor and the said pump, and a box surrounding the complete gear, the said control means comprising in combination a gear-wheel motor consisting of a casing, two gear wheels so mounted in the said casing as to continuously mesh with each other, means for conducting oil under pressure to the one or the other side of the said gear wheels for the purpose of being able to drive the said gear wheels in either direction, the said casing being firmly connected with the said box surrounding the gear or with other fixed parts, two eccentrics situated one over the other, means for establishing connection between the said gear-wheel motor and the said eccentrics and adapted to allow each of the said gear wheels always to act on the same eccentric and producing the simultaneous mutual displacement of the said eccentrics, means adapted to permit selectively of manual or automatic control of the said gear-wheel motor, and means connected with those parts of the gear serving to distribute the liquid between the said motor and the said pump, the said latter means also being connected with the said box or other parts through the medium of elements adapted always to hold the said latter means in proper position in relation to the said eccentrics.

2. A structure as set forth in claim 1, wherein the means distributing the liquid between the said pump and the said motor include a hollow spindle which communicates with the pressure chamber of the gear and also with the said gear-wheel motor, so that the oil under pressure from the pressure chamber of the gear is employed for the drive of the servo-motor.

3. A structure as set forth in claim 1, wherein the said two gear wheels are equal to one another and the means establishing connection between the said gear-wheel motor and the said eccentrics comprise two pinions having the same transmission ratio and the two eccentrics have the same degree of eccentricity, comprising further a clutch which is fitted between the outer of the two eccentrics and the said pinion connected therewith and is adapted to ensure the transmission of equal angular velocity, and means which are fitted between the parts connected with the mechanism distributing the liquid between the said motor and the said pump and the said box or other fixed parts, and which are so arranged that the means connected with the said distributing mechanism are unable to perform rotary movement in relation to the said box or fixed parts.

4. A structure as set forth in claim 1, wherein the elements adapted to permit of manual control of the gear-wheel motor comprise a regulator valve which conducts the liquid to the one or the other side of the said gear wheels, a lever mechanism for moving the said regulator valve, the said lever mechanism being firmly mounted at one point and being connected at a second point with manually actuated elements, and at a third point with means connected with those elements which cause the mutual rotation of the said eccentrics, whereby the said means connected with the elements causing the rotation of the eccentrics so act on the said lever mechanism that simultaneously with the displacement of the said eccentrics the said regulator valve is finally returned into that position in which it blocks the pipes of the said gear-wheel motor.

5. A structure as set forth in claim 1, wherein the elements adapted to cause automatic control of the gear-wheel motor comprise a regulator valve which conducts the liquid to the one or the other side of the said gear wheels, a lever mechanism which serves to shift the said regulator valve and is firmly mounted at one point, means which cause the control of the said regulator valve and with which the said lever mechanism is connected at a second point, the said means being displaceable by the pressure of the liquid in the gear, resilient elements which are connected with the said means serving to control the said regulator valve and thus act in opposition to the pressure of the liquid in the gear, so that these means vary their position dependent on the pressure of the liquid in the gear and by variation of their position act on the displacement of the said second point of the said lever mechanism, and a device with which the said lever mechanism engages at a third point and which is connected with those elements causing the mutual rotation of the eccentrics, whereby the said device so acts on the said lever mechanism that simultaneously with the displacement of the said eccentrics the said regulator valve is finally returned into that position in which it blocks the pipes of the said gear-wheel motor.

6. A structure as set forth in claim 1, wherein the elements which are adapted to control the said gear-wheel motor automatically and by hand comprise a regulator valve which conducts the liquid to the one or the other side of the said gear wheels, a lever mechanism which serves to shift the said regulator valve and is movably mounted at one point, a lever mechanism which permits of adjustment of the said point by hand, means which cause the control of the said regulator valve and with which the said lever mechanism is connected at a second point, the said means being displaceable by the pressure of the liquid in the gear, resilient elements which are connected with the said means serving to control the said regulator valve and thus act in opposition to the pressure of the liquid in the gear, so that these means vary their position dependent on the displacement of the said second point of the said lever mechanism, and a device with which the said lever mechanism engages at a third point and which is connected with those elements causing the mutual rotation of the eccentrics, whereby the said device so acts on the said lever mechanism that simultaneously with the displacement of the said eccentrics the said regulator valve is finally returned into that position in which it blocks the pipes of the said gear-wheel motor.

7. The combination in accordance with claim 1 including means comprising a piston subjected to the pressure of the oil in the suction space of the hydraulic variable speed gear, a second piston subjected to the pressure of the oil in the pressure space of said gear, a rod connecting the two pistons and a spring biasing said elements in opposition to the pressure in the pressure chamber.

BERNHARD BISCHOF.